(12) United States Patent
Milsted

(10) Patent No.: US 9,509,498 B2
(45) Date of Patent: Nov. 29, 2016

(54) SYSTEM AND METHOD FOR TRANSMITTING DATA

(71) Applicant: OMLIS LIMITED, Heaton, Newcastle Upon Tyne, Tyne and Wear (GB)

(72) Inventor: Markus Milsted, NewCastle Upon Tyne (GB)

(73) Assignee: OMLIS LIMITED, London (GB)

(*) Notice: Subject to any disclaimer, the term of this patent is extended or adjusted under 35 U.S.C. 154(b) by 0 days.

(21) Appl. No.: 14/401,670

(22) PCT Filed: May 17, 2013

(86) PCT No.: PCT/GB2013/051283
§ 371 (c)(1),
(2) Date: Nov. 17, 2014

(87) PCT Pub. No.: WO2013/171506
PCT Pub. Date: Nov. 21, 2013

(65) Prior Publication Data
US 2015/0102104 A1    Apr. 16, 2015

(30) Foreign Application Priority Data

May 18, 2012 (GB) .................................. 1208750.8

(51) Int. Cl.
*G06K 7/00* (2006.01)
*H04L 9/08* (2006.01)
(Continued)

(52) U.S. Cl.
CPC ........... *H04L 9/0816* (2013.01); *G06K 7/1434* (2013.01); *G06K 19/14* (2013.01);
(Continued)

(58) Field of Classification Search
CPC ................. G06K 19/06028; G06K 19/06037; G06K 7/14; G07F 7/1008; G06Q 20/341

USPC ................................................. 235/380, 494
See application file for complete search history.

(56) References Cited

U.S. PATENT DOCUMENTS 5,450,491 A * 9/1995 McNair ............ G06K 19/06028
235/380
2005/0039092 A1    2/2005 Soule, III et al.
(Continued)

FOREIGN PATENT DOCUMENTS

GB    2478712 A    9/2011
GB    2489247 A    9/2012
(Continued)

OTHER PUBLICATIONS

International Search Report and Written Opinion issued in International Application No. PCT/GB2013/051283, 11 pages (issued Oct. 11, 2013).
Combined Search and Examination Report issued in Great Britain Application No. GB1208750.8, 6 pages (Jun. 17, 2013).

*Primary Examiner* — Karl D Frech
(74) *Attorney, Agent, or Firm* — Rothwell, Figg, Ernst & Manbeck PC

(57) ABSTRACT

A method of transmitting authorization data, said authorization data for authorizing a process. The method comprises securely providing an encryption key to an encrypter and a decrypter; encrypting at the encrypter input authorization data with the encryption key; converting the encrypted data into an optical code pattern; displaying the optical code pattern on a display device; reading the optical code pattern with an optical reader; converting the optical code pattern into received encrypted data corresponding the encrypted data; decrypting the received encrypted data at the decrypter to generate decrypted data corresponding to the input authorization data, and authorizing the process with the data corresponding to the input authorization data.

19 Claims, 9 Drawing Sheets

(51) Int. Cl.
*G09C 5/00* (2006.01)
*H04L 9/32* (2006.01)
*G06Q 20/32* (2012.01)
*G06K 7/14* (2006.01)
*G06K 19/14* (2006.01)
*G06Q 20/40* (2012.01)
*H04L 9/14* (2006.01)

(52) U.S. Cl.
CPC .......... *G06Q20/3274* (2013.01); *G06Q 20/40* (2013.01); *G09C 5/00* (2013.01); *H04L 9/0869* (2013.01); *H04L 9/14* (2013.01); *H04L 9/3242* (2013.01); *H04L 2209/56* (2013.01)

(56) References Cited

U.S. PATENT DOCUMENTS

| | | |
|---|---|---|
| 2006/0251250 A1 | 11/2006 | Ruggiero et al. |
| 2008/0210754 A1 | 9/2008 | Lovett |
| 2009/0166438 A1 | 7/2009 | Sanchez et al. |
| 2011/0208659 A1 | 8/2011 | Easterly et al. |

FOREIGN PATENT DOCUMENTS

| | | |
|---|---|---|
| WO | WO 9506371 A1 | 3/1995 |
| WO | WO 2012111019 A1 | 8/2012 |

* cited by examiner

1

SYSTEM AND METHOD FOR TRANSMITTING DATA

CROSS-REFERENCE TO RELATED APPLICATION

This application is a 35 U.S.C. 371 National Phase Entry Application from PCT/GB2013/051283, filed May 17, 2013, which claims the benefit of GB 1208750.8 filed on May 18, 2012, the disclosures of which are incorporated herein in their entirety by reference.

FIELD OF THE INVENTION

The present invention relates to systems and methods for transmitting data and in particular authorisation data.

BACKGROUND

Techniques for transmitting data securely, and in particular techniques for transmitting payment authorisation data, are becoming increasingly important as cash is used less and less as a means to pay for goods and services.

Conventional techniques include those based on the EMV (Europay, Mastercard, VISA) smartcard system (called "Chip and PIN" in the UK) use a smartcard with a secret personal identification number (PIN) code stored in a microchip embedded on the card. When the card is used it is placed in a merchant terminal and a user enters a PIN. The PIN is then sent by the terminal to the embedded microchip on the card and if the PIN entered by the user matches that stored on the microchip, the microchip returns a "PIN ok" message to the terminal and the transaction is authorised.

In another conventional technique, so-called "contactless payment" is enabled by providing a user's payment smartcard with a radio frequency identification (RFID) tag. To authorise a payment, the user passes their smartcard over an RFID reader on the merchant terminal. The RFID reader detects payment authorisation information present in the RFID tag and if this information is verified, payment is authorised.

Conventional techniques, such as those described above, whilst providing an improvement in security over payment methods authorised only by a user's signature or by information stored on a magnetic strip are still potentially vulnerable to various attacks. In a simple example, if a third party discovers a user's secret PIN and then steals their card, they can potentially make fraudulent payments until the card is cancelled. In another example, the authorisation information stored on the RFID tag of a user's smartcard could be acquired by an unauthorised third party by passing a suitably adapted reader over the user's card. In more sophisticated examples, so-called "man-in-the-middle" attacks can be used in which security data exchanged between the smartcard and the merchant's terminal is intercepted by a third party who then attempts to use this intercepted data to authorise fraudulent payments or perform some other fraudulent activity.

Whilst it is possible to put in place security measures to further reduce the likelihood of smartcard payment systems and other authorisation data transmission systems being compromised, such measures are likely to increase the complexity of the payment system and reduce the convenience for users and merchants. It is therefore desirable to provide a method for securely transmitting authorisation data, such as payment data, with an increased resilience to fraudulent attacks but that is still convenient to use.

SUMMARY OF INVENTION

In accordance with a first aspect of the present invention there is provided a method of transmitting authorisation data, said authorisation data for authorising a process. The method comprises securely providing an encryption key to an encrypter and a decrypter; encrypting at the encrypter input authorisation data with the encryption key thereby generating encrypted data; converting the encrypted data into an optical code pattern; displaying the optical code pattern on a display device; reading the optical code pattern with an optical reader; converting the optical code pattern into received encrypted data corresponding the encrypted data; decrypting the received encrypted data at the decrypter to generate decrypted data corresponding to the input authorisation data, and authorising the process with the data corresponding to the input authorisation data.

In accordance with this aspect of the invention, a technique is provided for transmitting authorisation data with an improved level of security whilst providing a level of convenience equivalent to that of prior art techniques.

To achieve this, authorisation data, such as payment authorisation data, is securely encrypted and then transmitted by the displaying and reading of an optical code pattern (such as a barcode or QR code). Unlike some conventional smartcard techniques in which a user's secret PIN could be discovered by simply watching the user enter the PIN into a merchant terminal, the authorisation data in accordance with the present invention is transmitted in encrypted form via the display of an optical code pattern which can be read by an optical scanner and is difficult for a third party to oversee visually or intercept electronically. Additionally, there is no "leakage" of a signal containing the authorisation data, unlike contactless payment systems in which propagation of the radio signal between the RFID tag in the smartcard and the RFID reader in the merchant terminal could be intercepted by a third party.

In accordance with one embodiment, the input authorisation data includes payment data indicating a payment amount. In conventional techniques such as smartcard techniques, the only authorisation information provided by the user indicating the user's intention to authorise a transaction is the entering of the user's PIN or the swiping of the smartcard over an RFID reader. However, in accordance with this embodiment, the user can themselves confirm a payment amount, prior to the authorisation data being transmitted, which is then encrypted before being converted into the optical code pattern. This further reduces the likelihood that information in a form useful to a malicious third party is intercepted because the authorisation data including payment data is encrypted prior to transmission. Even if the authorisation data and the payment data could be intercepted (the likelihood of which is reduced by virtue of the optical code pattern transmission discussed above), it would be necessary to know the encryption key.

In accordance with some embodiments, the method further comprises receiving input seed data from a user at the encrypter; seeding a pseudo-randomising process with the input seed data from the user, generating the encryption key using an output of the pseudo-randomising process and securely transmitting the encryption key to the decrypter. In accordance with this example, in order to increase the robustness with which the encryption key is provided to the encrypter and decrypter, input "seed" data (such as personal details of the user) is used to seed a pseudo-randomising process which generates the encryption key at the encrypter. This is then transmitted to the decrypter securely by using, for example, a secure channel. In other examples, the pseudo-randomising process is alternatively or additionally seeded with one or more environmental variables detected by a user device. The environmental variables are variables derived from particular characteristics of the environment around the user device and/or the state/condition of the user device that can be automatically detected by the user device without the need for further user input.

In some embodiments input seed data from the user comprises a plurality of variables and, prior to seeding the pseudo-randomising process with the input seed data from the user, the input seed data is scrambled by a scrambling process.

In some embodiments of the invention, the method further comprises generating a new encryption key after a pre-defined period. In such embodiments, to further improve security a new security key is generated at pre-defined intervals. The decrypter will be provided with the new encryption key once it has been generated. In some embodiments a new encryption key is generated after a pre-defined period using the previously collected user input seed data and a newly detected environmental variable.

In some embodiments, the method further comprises receiving user validation data and converting the encrypted data into the optical code pattern upon matching the user validation data with stored user validation data. In order to further improve security, in accordance with these embodiments, the authorisation data will only be transmitted to authorise the process if a user provides user validation information which can be used to validate the user's identity. In some embodiments, the user validation data is bio-identification data associated with a biological characteristic of a user.

In some embodiments the optical code pattern is one of a barcode or a quick response (QR) code.

In accordance with a second aspect of the invention there is provided a system for transmitting authorisation data, said authorisation data for authorising a process. The system comprises a user device and an authorisation server. The user device and authorisation server have stored thereon an encryption key. The user device is arranged to encrypt input authorisation data with the encryption key, convert the encrypted data into an optical code pattern and display the optical code pattern on a display device. The system further comprises an optical reader arranged to read the optical code pattern and convert the optical code pattern into received encrypted data corresponding the encrypted data. The authorisation server is arranged to receive the encrypted data and, using the encryption key, generate decrypted data corresponding to the input authorisation data and authorise the process in accordance with the decrypted data corresponding to the input authorisation data.

In accordance with a third aspect of the invention there is provided a user device for transmitting authorisation data. The authorisation data is for authorising a process. The user device comprises a processor arranged to encrypt input authorisation data with an encryption key and to convert the encrypted data into an optical code pattern and to display the optical code pattern on a display device such that the optical code pattern can be read by an optical reader and converted into received encrypted data corresponding to the encrypted data.

In one embodiment of this aspect of the invention, the user device is arranged to generate the encryption key and to securely transmit the encryption key to an authorisation server, said authorisation server being arranged to decrypt the received encrypted data to generate decrypted data corresponding to the input authorisation data, and authorise the process in accordance with the data corresponding to the input authorisation data. In some embodiments the user device is a smart-phone.

In accordance with a fourth aspect of the invention, there is provided a method of transmitting authorisation data. The authorisation data is for authorising a process. The method comprises encrypting at a user device input authorisation data with an encryption key; converting the encrypted data into an optical code pattern; and displaying the optical code pattern on a display device such that the optical code pattern can be read by an optical reader and converted into received encrypted data corresponding to the encrypted data thereby enabling the encrypted data to be decrypted and used to authorise a process.

Various further aspects and features of the invention are specified in the claims.

BRIEF DESCRIPTION OF DRAWINGS

Embodiments of the present invention will now be described by way of example only with reference to the accompanying drawings where like parts are provided with corresponding reference numerals and in which.

DETAILED DESCRIPTION

Figure 1:
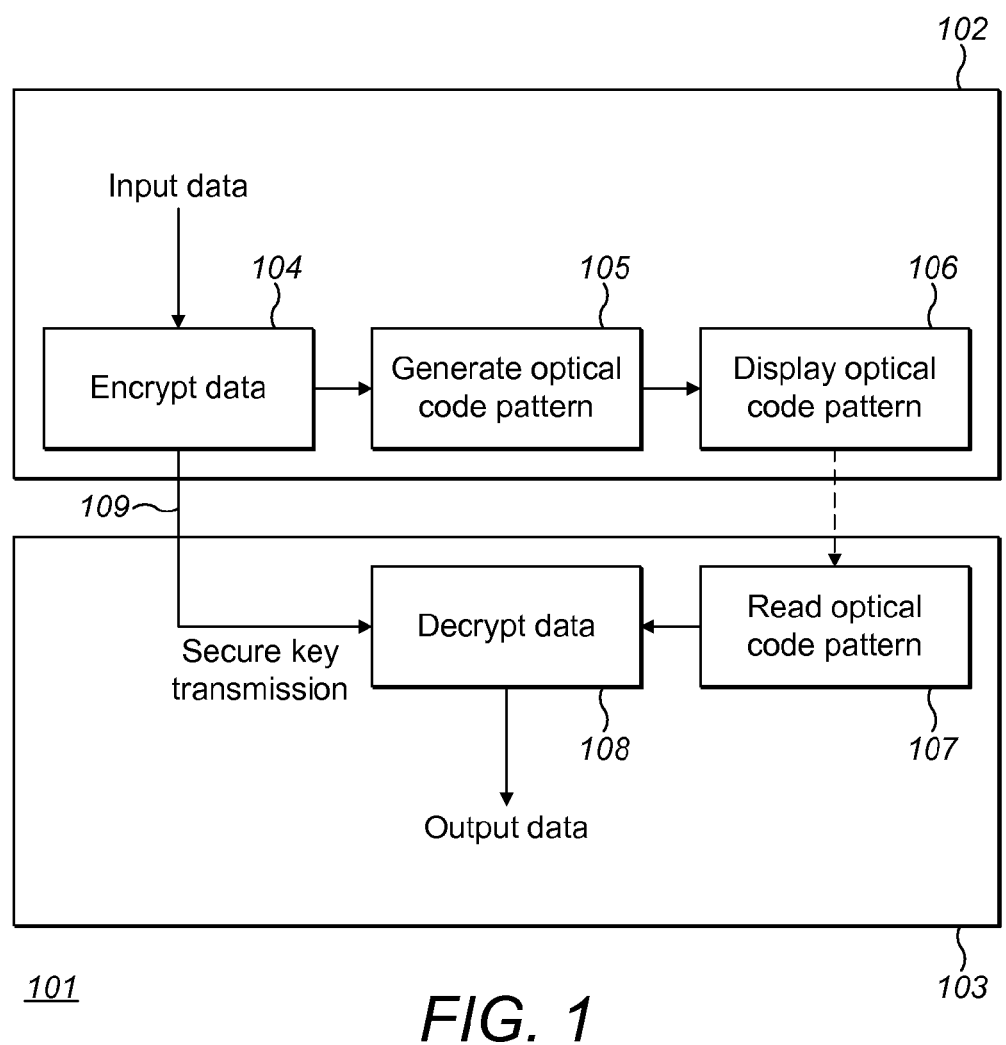
FIG. 1 provides a schematic diagram of a system for securely transmitting authorisation data in accordance with an example of the present invention.

FIG. 1 provides a schematic diagram of a system 101 for securely transmitting authorisation data in accordance with an example of the present invention. The system comprises a data source 102 and a data destination 103. The system 101 is arranged to securely transmit encrypted data between the data source 102 and data destination 103. In some examples the data source 102 is a user device and the data destination is an authorisation server.

The data source 102 receives input authorisation data to be encrypted at an encryption unit 104 (i.e. an encrypter). In some examples, the input authorisation data can simply be an indication that a process is to be authorised. In other examples the input authorisation data may include additional information relating to a variable of the process, such as the amount of payment to be transferred between bank accounts in a payment authorisation process. Encrypted data is output from the encryption unit 104 and input to an optical code pattern generator 105. The optical code pattern generator 105 generates an optical code pattern which corresponds to the encrypted data encoded as an optical pattern. The optical code pattern is output to a display device 106 which displays the optical code pattern. The optical code pattern can be any suitable optical pattern with which data can be encoded. Examples include bar-codes, quick response (QR) codes and so on. In other words an optical code pattern is any suitable pattern the arrangement of which depends on the information that is encoded in the pattern. For example if a given optical code pattern contains a grid comprising a plurality of blocks, each block can represent a specific bit of a data string. For example, if a given block in the optical code pattern is shaded dark, this can indicate that the specific bit of the data string corresponding to that block has a binary value of zero. On the other hand, if a given block in the optical code pattern is has a light shading or no shading, this can indicate that the specific bit of the data string corresponding to that block has a binary value of one.

It will be understood that the term "optical code pattern" refers to any suitable optical pattern the arrangement of which can represent (i.e. encode) data and that can be displayed in a suitable manner. It will be understood that the optical code pattern need not be distinguishable by a human as long as the optical code pattern can be read by a suitable reader, i.e. the optical code pattern is machine-readable.

The data destination 103 includes an optical reader 107 which is arranged to read the optical code pattern displayed on the display device 106. The optical reader 107 is arranged to convert the optical code pattern read from the display device 106 into data corresponding to the encrypted data generated by the encryption unit 104 and output this data to a decryption unit 108 (i.e. a decrypter). The decryption unit 108 is arranged to decrypt the data received from the optical reader 107 and decrypt this data to generate decrypted data corresponding to the original input authorisation data. The decrypted data corresponding to the original input authorisation data is then used to authorise a process.

The input authorisation data is encrypted at the encryption unit 104 using a secure encryption key. Typically the secure encryption key is generated at the data source 102 or the data destination 103. Prior to the encryption of the input authorisation data the secure encryption key is communicated via a secure channel 109 between the data source 102 and the data destination 103.

Figure 2:
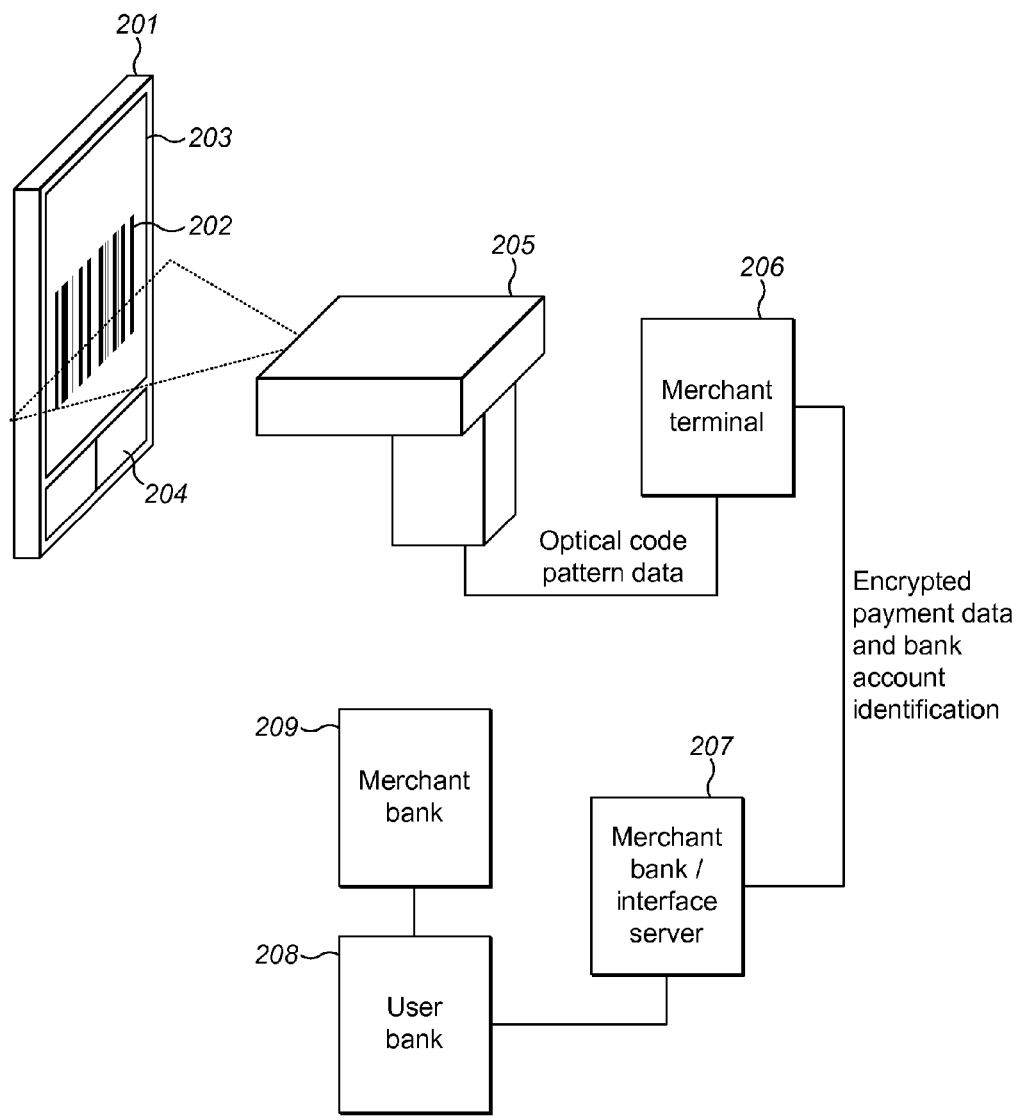
FIG. 2 provides a schematic diagram of an example of a system arranged in accordance with an example of the present invention for transmitting authorisation information such as information authorising payment.

FIG. 2 provides a schematic diagram of an example of a system arranged in accordance with an example of the present invention for transmitting authorisation information such as information authorising payment. The system includes a user device 201 (the data source) such as a smart phone comprising secure data transmission software which when run on a processor of the user device controls the smart phone to display an optical code pattern 202 on a display screen 203 of the user device 201.

In use, when a user wishes to make a payment to a merchant, for example for a product or service, a user enters payment information into the user device 201 using a conventional user interface such as a keypad 204. The payment information may correspond simply to an indication that the user intends to authorise a purchase or may correspond to an indication that a user intends to authorise the purchase and an indication of the price of the product or service that the user wishes to purchase from the merchant. The secure data transmission software running on the user device controls the user device to encrypt the payment information using a secret authorisation key (i.e. a secure encryption key) previously stored on the user device 201. The secret authorisation key is also stored at a bank authorisation server (the data destination) as described further below. The secure data transmission software then controls the user device to convert the encrypted payment information into the optical code pattern 202 and display this on the display screen 203 of the user device 201. The optical code pattern also includes data identifying the bank account associated with the user. Typically, this data is not encrypted using the secret authorisation key.

The system further includes an optical reader 205, typically controlled by the merchant, that is arranged to scan the optical code pattern 202 using any suitable technique and generate data corresponding to the scanned optical code pattern 202. The data corresponding to the scanned optical code pattern is then sent to a merchant terminal 206 which converts this into data corresponding to the payment information encrypted using the secret authorisation key and the bank account identification information. The merchant terminal 206 then transmits the data corresponding to the encrypted payment information and the bank account identification information to a merchant/bank interface server 207. Using the bank account identification information, the merchant/bank interface server 207 identifies a corresponding bank and sends the encrypted payment information to a user bank authorisation server 208 associated with the user's bank.

The bank authorisation server 208, uses the secret authorisation key to decrypt the payment information and determine whether or not the associated payment is to be authorised. If, for example, the user's bank account contains insufficient funds to make the payment to the merchant, a decline message is sent back to the merchant/bank interface server 207 and then onwards to the merchant terminal 206. If, on the other hand, the user's bank account does contain sufficient funds, an accept message is sent back to the merchant/bank interface server 207 and then onwards to the merchant terminal 206. Further information may also be transmitted at this point also, for example the payment information confirming to the merchant the amount of payment that will be made. The user bank authorisation server then authorises a transfer of funds to a bank 209 associated with the merchant.

In some examples the secure authorisation key is generated at the user device. The secure authorisation key is then communicated to the user bank 208 using a secure channel. The secure channel can be provided by any suitable connection for securely transmitting data between the user device 201 and the user bank 208 known in the art. In some examples the secure channel is provided by the user device 201 sending a secure message via a separate network (not shown). For example, if the user device is a smart-phone or similar device equipped with a radio interface enabling the user device 201 to communicate with a public land mobile network, the secure channel may be provided by the user device sending an encrypted short message service (SMS) message comprising the secure authorisation key via the PLMN to the user bank authorisation server 208.

In some examples, when the secure data transmission software is initially run on the user device 201, the secure data transmission software collects seed information which is used to generate the secure authorisation key. The seed information is used by the secure data transmission software to seed a random value generator. The random value generator generates a value which is in turn used to generate a cryptographic key using techniques known in the art. Any suitable key generating technique can be used, for example one based on an RSA (Rivest, Shamir and Adleman) algorithm. The cryptographic key is used as the secure authorisation key and securely transmitted to the bank authorisation server 208 as described above.

In some examples the secure data transmission software collects the seed information by prompting the user to enter various pieces of information. This information is then converted into an appropriate form and used to seed the random value generator.

In some examples, the secure transmission software collects the seed information by collecting values associated with any suitable varying value or information which can be detected by the user device, i.e. environmental variables which the user or any other third party would have limited or no knowledge of.

Typically, environmental variables are variables derived from particular characteristics of the environment around the user device and/or the state/condition of the user device that can be automatically detected by the user device without the need for further user input. The environmental variables would be expected to vary over time and are to a greater or lesser degree unique to the user device and are therefore difficult to predict or guess. For example, the environmental variables can relate to one or more of biological, geographical, chronological or atmospheric conditions as detected at the user device. Examples include ambient light conditions, ambient temperature, geographic location, ID of a base station to which the user device is connected, detected speed of the user device relative to one or more base stations and so on. For example the user device may include a camera device. The secure data transmission software may be arranged to control the camera device to determine a value associated with current ambient light conditions. In another example, the user device may be arranged to detect a base station identity with which the user device currently has a radio link with.

Figure 3:
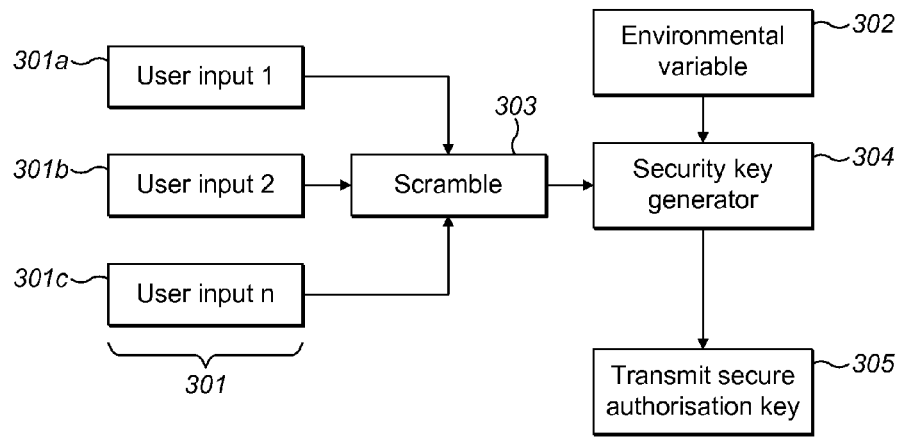
FIG. 3 provides a schematic diagram illustrating a process by which the secure authorisation key can be generated in accordance with an example of the present invention.

In some examples the secure key can be generated using a combination of user input seed information and environmental variables as shown in more detail in FIG. 3.

FIG. 3 provides a schematic diagram illustrating a process by which the secure authorisation key can be generated in accordance with an example of the present invention. As will be understood, the process illustrated in FIG. 3 and explained below is typically controlled by the secure data transmission software running on user device.

At a first stage 301a user is prompted to enter various pieces of information using the user interface incorporated into the user device. For example, the user may be prompted at a first input point 301a to input their favourite colour. At a second input point 301b the user may be prompted to enter the name of the place they were born, at a third input point 301c the user may be requested to draw a picture on a touch screen incorporated into the user device.

Separately, at a second stage, the user device collects one or more environmental variables by an environmental variable collecting process, such as base station ID, ambient light conditions and so on as described as above.

Data corresponding to that collected at the various input points 301a, 301b, 301c is then scrambled by a scrambling process 303. Any suitable scrambling process can be used, for example one based on an additive scrambling process or a multiplicative scrambling process. At a fourth stage an output from the scrambling process 303 and the one or more environmental variables collected at the second stage 302 are used to seed a security key generation process 304. The security key generation process 304 can be provided using any suitable technique, for example using an encryption algorithm such as an RSA (Rivest, Shamir and Adleman) based algorithm.

A secure authorisation key is generated by the secure key generation process 304 and then transmitted to the data destination (for example the bank authorisation server) by a secure data transmission process 305 (for example the SMS process described above).

In some examples, a new secure authorisation key is generated periodically using the previously entered and scrambled user data, but with a new environmental variable. For example the secure data transmission software may be arranged to generate and securely transmit a new secure authorisation key to the data destination (for example the bank authorisation server) every twenty four hours.

In some examples, when the secure data transmission software is run as described above to transmit secure data (such as the secure payment information) using the optical code pattern as described above, prior to the optical code pattern being generated, the user is prompted to provide user validation information. This can be provided in any suitable form, for example an alphanumeric security code or personal identification number (PIN) code entered using the keypad 204, drawing a pattern on a touch screen of the user device, or inputting some form of bio-identification data by, for example, holding a finger tip against a finger tip reader incorporated with the user device, speaking a predefined word or making a predefined sound into a microphone incorporated within the user device which is analysed by the secure data transmission software to identify the user. The secure data transmission software will generate the optical code pattern to transmit the secure data (such as secure payment information) only if the user validation information matches user validation information previously provided. For example the user may have previously entered the user validation information on the user device after which the user validation information was stored on the user device. An example of the process for transmitting encrypted data (such as the secure payment data) is explained in more detail with reference to FIG. 4.

Figure 4:
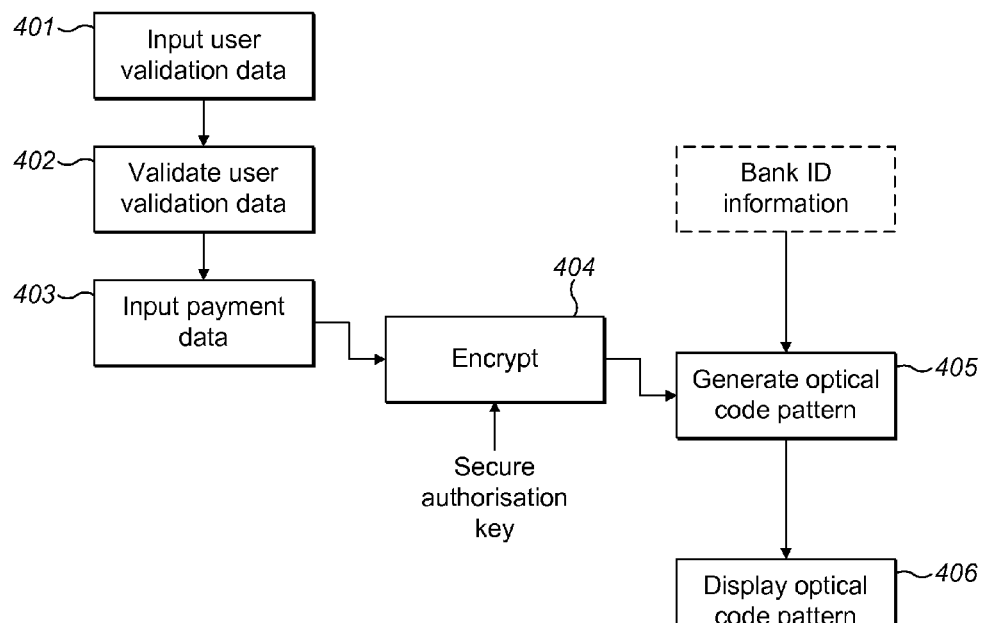
FIG. 4 provides a schematic diagram illustrating a process by which the encrypted data can be generated in accordance with an example of the present invention.

FIG. 4 provides a schematic diagram illustrating a process by which encrypted data can be generated in accordance with an example of the present invention after the secure authorisation key has been generated as described with reference to FIG. 3. As will be understood, the process illustrated in FIG. 4 and explained below is typically controlled by the secure data transmission software running on the user device.

Figure 5:
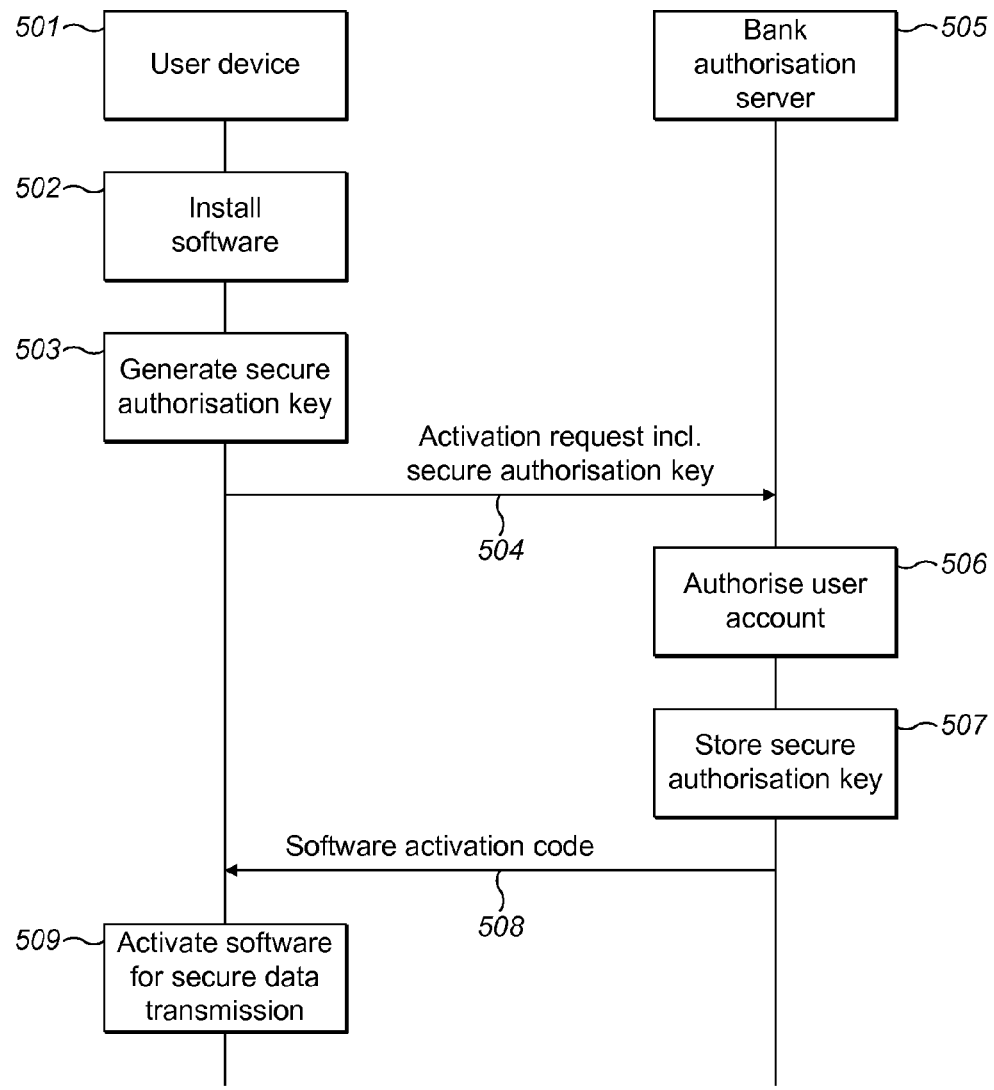
FIG. 5 provides a schematic diagram illustrating a process in accordance with an example of the present invention for authorising data transmission software.

At a first stage 401a user validation process 401 is performed in which the user device requests input of user validation information such as a PIN code suitable bio-identification data. At a second stage, a validation process 402 is performed in which the user device validates if the input user validation information corresponds with user validation information previously input to the user device. Assuming that after the validation process 402 has been performed, it is determined that the user validation information authenticates the user (for example matches previously input user validation data), then an input authorisation data process 403 is performed where, for example, payment data is input by the user. At a third stage, the input authorisation data received during the input authorisation data process 403 is then encrypted by an encryption process 404 using the secure authorisation key generated as described above with reference to FIG. 4. At a fourth stage an optical code pattern is generated by an optical code pattern generation process 405. As described above, the optical code pattern encodes the encrypted input authorisation data as an optical pattern. In some examples further unencrypted data, such as bank ID information is also encoded in the optical pattern by the optical code pattern generation process 405. At a final stage, an optical code pattern displaying process 406 is performed and the optical code pattern is displayed. FIG. 5 provides a schematic diagram illustrating a process in accordance with an example of the present invention for authorising the data transmission software described above.

To start the process, the data transmission software is installed 502 on a user device 501 (i.e. a user device as described above). This can be achieved in any suitable way as is known in the art such as downloading the software from a website or installing the software using some form of physical media such as a memory card and so on. A secure authorisation key is then generated 503 as described above with reference to FIG. 3. The user device 501 then transmits 504 an activation message and the secure authorisation key to an authorisation server 505. The activation request includes an identity of the user and/or the user device. As will be understood, in the case of the system shown in FIG. 2 this will be an authorisation server controlled by the user's bank. The authorisation server SOS performs an authorisation process 506 to determine whether or not the user associated with the user device is authorised to use the data transmission software to transmit data, such as secure payment data. When performing the authorisation process, the authorisation server 505 may, for example, compare the identity of the user and/or user device with a list of authorised users and determine that the user and/or user device is authorised to use the secure data transmission software if the identity of the user and/or user device is on the list of authorised users.

Once the authorisation server 505 has determined that the user associated with the user device is authorised to use the secure data transmission software to transmit data, the authorisation server 505 stores 507 the secure authorisation key previously transmitted 504 by the user device 501. The authorisation server 505 then transmits 508 a software activation code to the user device 501. Upon receipt of the activation code the user device 501 activates 509 the secure data transmission software using the software activation code.

As will be understood, the activation request and software activation code, along with any other information exchanged between the user device and the authorisation server can be transmitted in any suitable way. For example, as described above the user device may be equipped with a radio interface to allow communication with the authorisation server via a PLMN.

Figure 6:
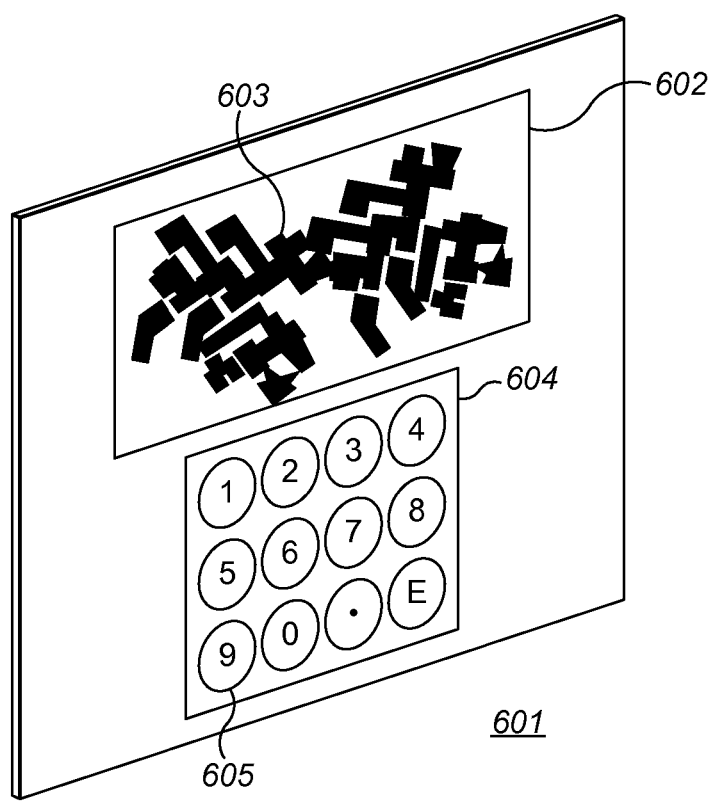
FIG. 6 provides a schematic diagram illustrating a user device in accordance with an example of the present invention suitable for use in the system shown in FIG. 2.

FIG. 6 provides a schematic diagram illustrating another example of a user device in accordance with an example of the present invention suitable for use in system shown in FIG. 2.

As described above, in some examples the user device includes additional functionality that is unrelated to the transmission of secure data. For example a smart phone performs other functions such as making and receiving voice calls etc. The user device 601 shown in FIG. 6 includes fewer or no additional functions beyond those associated with the transmission of secure data. In some examples the user device 601 may have dimensions which are similar to or substantially match the dimensions associated with, for example, a conventional credit or debit card. The user device 601 includes a display screen 602 arranged to display an optical code pattern 603 and control circuitry, such a control processor (not shown) to control its operation. The user device 601 includes a user input means 604 such as a keypad including various numbered keys 605. The user device may have pre-installed thereon a secret authorisation key.

In use, the user device 601 shown in FIG. 1 operates in a similar way to the user input device 201 shown in FIG. 2. Specifically, if a user wishes to make a payment to a third party, the user enters payment information into the user device 601 using the keypad 604. The control circuitry controls the user device 601 to encrypt the payment information using the pre-installed secret authorisation key. The control circuitry then controls the user device to convert the encrypted authorisation key into the optical code pattern 603 and display this on the display screen 602. As discussed above, the optical code pattern also includes data identifying the bank account associated with the user.

In some examples, before generating the optical code pattern 603 the user must enter a validation code into the keypad 604.

In the system shown in FIG. 2, the optical reader was described in terms of a barcode scanner. However, in some examples, a camera fitted to a smart phone or similar device can be used to read an optical code pattern.

Figure 7:
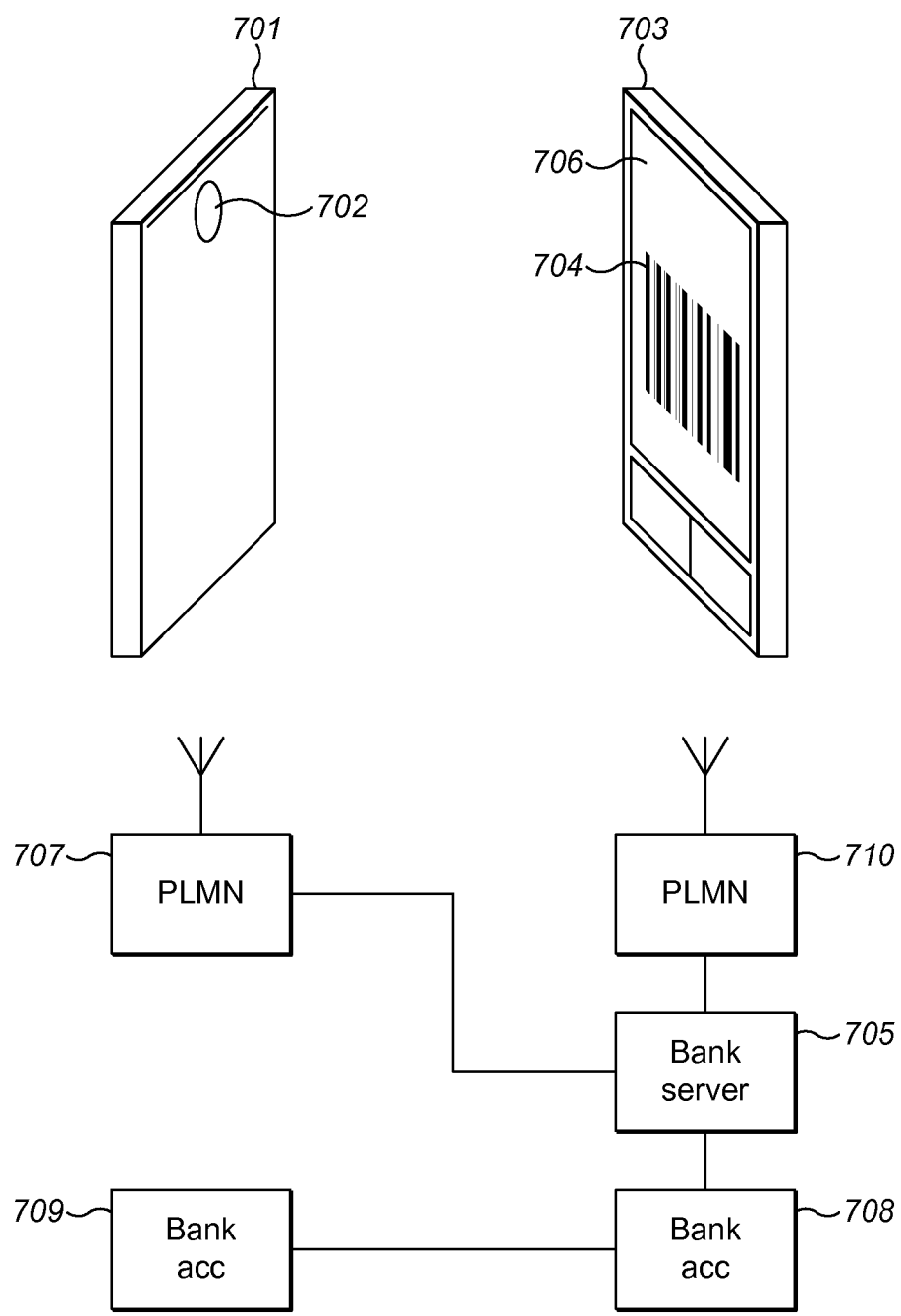
FIG. 7 provides a schematic diagram of a system arranged in accordance with an example of the present invention.

FIG. 7 provides a schematic diagram of a system arranged in accordance with an example of the present invention.

A first user device 701 is shown. The first user device is smart phone or the like and includes secure data transmission software installed thereon that is arranged to control the camera device to capture image data of a displayed optical code pattern 704. In the example shown in FIG. 7a, the optical pattern 704 is displayed on a screen of a second user device 703 such as a smart phone which also includes secure data transmission software installed thereon.

In operation, the system shown in FIG. 7 can authorise a process such as authorising a payment to a bank account of a user of the first device 701 from a bank account of a second user of the second user device 703.

Specifically, the optical code 704 can be generated in a similar manner to the generation of the optical pattern 202 described above with reference to FIG. 2.

Thus, when the second user wishes to make a payment to the first user, the second user enters payment information into the second user device 703. The payment information may correspond to an indication of the amount of money that the second user wishes to transfer to the first user. The secure data transmission software running on the second user device 703 controls the user device to encrypt the payment information using a secure encryption key previously stored (or generated) on the user device 703.

The secret authorisation key is also stored at a bank authorisation server 705 (the data destination).

The secure data transmission software running on the second user device 703 controls the second user device 703 to convert the encrypted payment information into the optical code pattern 704 and display it on a display screen 706. The optical code pattern also includes bank ID data identifying a bank associated with a bank account of the second user and bank account data identifying a bank account associated with the second user. Typically, this data is not encrypted using the secret authorisation key.

The camera device 702 of the first user device 701 is controlled by the secure data transmission software and is arranged to capture image data of the optical code pattern 704.

The image data is then transmitted by the first user device 701 to a public land mobile network system 707 as an authorisation request message. The PLMN includes functionality that recognises the authorisation request message and transmits this via a suitable data link to the bank authorisation server 705 which is identified by the bank ID data.

The bank authorisation server 705 is arranged to extract the image data from the authorisation request message to recover the payment information encrypted using the secret authorisation key. The bank authorisation server 705, uses the secret authorisation key to decrypt the payment information and determine whether or not the associated payment is to be authorised from the bank account indicated in the bank account data.

If the payment is to be authorised then the bank authorisation server 705 arranges an appropriate transfer of funds from the second user's bank account 708 to the first user's bank account 709 using techniques known in the art.

As described above, the secret authorisation key is also stored at a bank authorisation server 705. In some examples, the secure authorisation key is generated by the secure data transmission software running on the second user device 703 in keeping with the technique described in relation to FIG. 3. This is then transmitted to the bank server 705 via a PLMN 710 associated with the second user device 703.

As will be understood, in some examples in which the first and second user devices are subscribers to the same cellular network provider, the first and second PLMNs shown in FIG. 7 will be the same PLMN.

Figure 8:
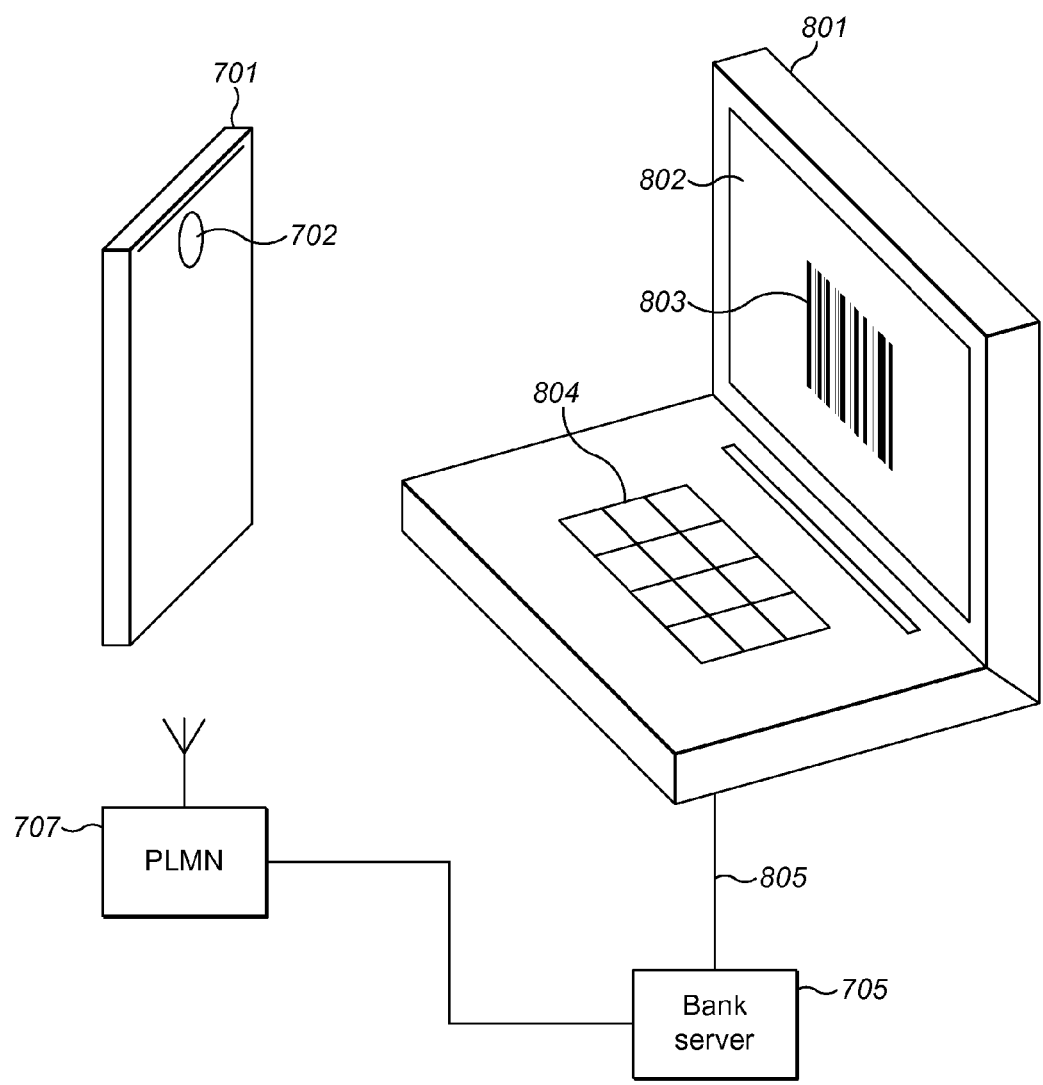
FIG. 8 provides a schematic diagram of another example of a system arranged in accordance with the present invention.

FIG. 8 provides a schematic diagram of another example of a system arranged in accordance with the present invention. In the system shown in FIG. 8, an optical code pattern is used to authorise a cash dispensing operation, performed, for example, at an automated teller machine (ATM).

FIG. 8 includes components in common with those in the system shown in FIG. 7. Like components with corresponding functionality are identified with the corresponding reference numerals.

A first user device 701 including a camera device 702 is shown. The user device 701 is controlled by secure data transmission software installed thereon and is arranged to capture image data of an optical code pattern 803 displayed on a display screen 802 of an ATM 801.

The ATM 801 includes a keypad 804 via which a user of the user device 701 can enter a withdrawal amount. The ATM 801 includes secure data transmission software installed thereon which when run on a processor (not shown) is arranged to encrypt the withdrawal amount with a secret authorisation key which is stored on the ATM 801 and also a bank authorisation server 705.

The optical code pattern 803 can be generated in a similar manner to the generation of the optical pattern 202 described above with reference to FIG. 2. Thus, when the user enters a withdrawal amount via the keypad 804, the secure data transmission software running on the ATM 801 controls the ATM 801 to encrypt the withdrawal amount using the secure encryption key.

The secure data transmission software running on the ATM 801 then controls the ATM 801 to convert the encrypted withdrawal amount into the optical code pattern 803 and display it on a display screen 802. The optical code pattern 803 also includes bank ID data identifying a bank associated with the ATM 801. Typically, this data is not encrypted using the secret authorisation key.

The camera device 702 of the first user device 701 is controlled by the secure data transmission software and is arranged to capture image data of the optical code pattern 803. The image data is then transmitted by the user device 701 to a public land mobile network system 707 as an authorisation request message. The secure data transmission software also adds bank account data to the authorisation request message identifying a bank account associated with the user of the user device 701. The PLMN 707 includes functionality that recognises the authorisation request message and transmits this via a suitable data link to the bank authorisation server 705 which is identified by the bank ID data.

The bank authorisation server 705 is arranged to extract the image data from the authorisation request message to recover the withdrawal amount encrypted using the secret authorisation key along with the bank account data.

The bank authorisation server 705, uses the secret authorisation key to decrypt the withdrawal amount and determine whether or not an associated withdrawal is to be authorised from the bank account identified by the bank account data. This is typically based on an amount in the user's bank account.

If the payment is to be authorised then the bank authorisation server 705 transmits an authorise message to the ATM 801 via a data connection 805 using techniques known in the art and a corresponding amount of cash is dispensed to the user via a cash dispensing slot 806.

The secret authorisation key can be communicated between the ATM 801 and the bank authorisation server 705 via the data connection 805.

Enhanced Optical Code Pattern

Generally the optical code pattern comprises a number of elements which are distinguishable by an optical code pattern reader as described above. In some examples these are static elements that are displayed continuously whilst the optical code is being displayed.

However, in some examples, for example if a conventional barcode scanner is used to scan a barcode displayed on a screen of a user device such as a smartphone, the barcode scanner may perform poorly due to the illumination light projected from the barcode scanner being scattered to some extent by the material of which the screen of the smartphone is composed.

Figure 9A:
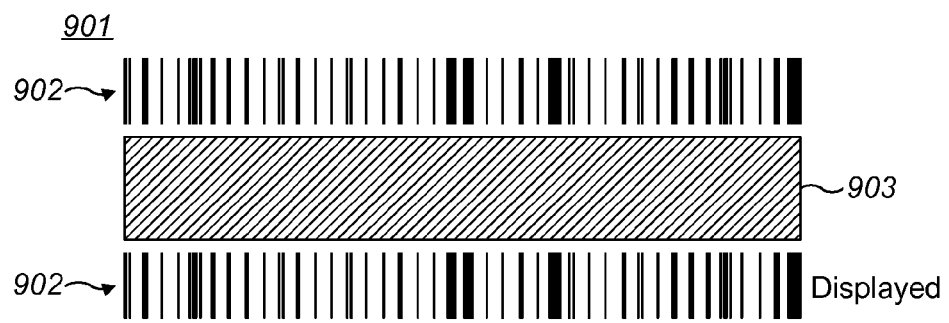
FIGS. 9a and 9b provide schematic diagrams of an example of an enhanced optical code pattern.

Accordingly, in some examples, an enhanced optical code pattern can be used. FIG. 9a provides a schematic diagram of an enhanced optical code pattern 901.

The optical code pattern 901 comprises a first part 902 and a second part 903. The first part 902 comprises non-varying elements. That is the static elements are typically displayed for the entire time the optical pattern code 901 is displayed and provide a graphical representation of the encoded authorisation data. As described above, the area over which the optical code pattern 901 is displayed may comprises a grid (not shown). The presence of a shaded or non shaded element or combination of elements at a particular position within the optical code pattern may define the presence of a one or a zero value for a specific bit position within a data string.

The optical pattern also comprises a second part 903. The second part is typically a prominently positioned block completely shaded or with a repeating pattern.

Unlike the first part 902, the display of the second part 903 varies with time. Specifically, the display of the second part 1003 is arranged to be "turned on and off" in a regular fashion that enables the encoded authorisation data to be conveyed to a suitably adapted optical reader.

Figure 9B:
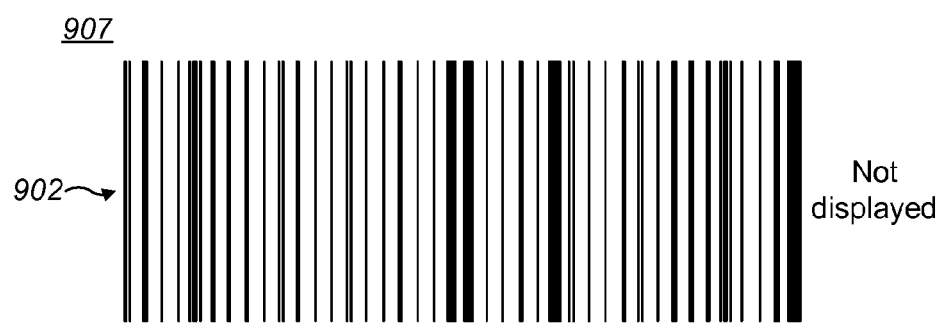

FIG. 9*a* illustrates a time period during which the second part 903 is displayed. FIG. 9*b* illustrates a time period during which the second part 903 is not displayed.

Figure 10:
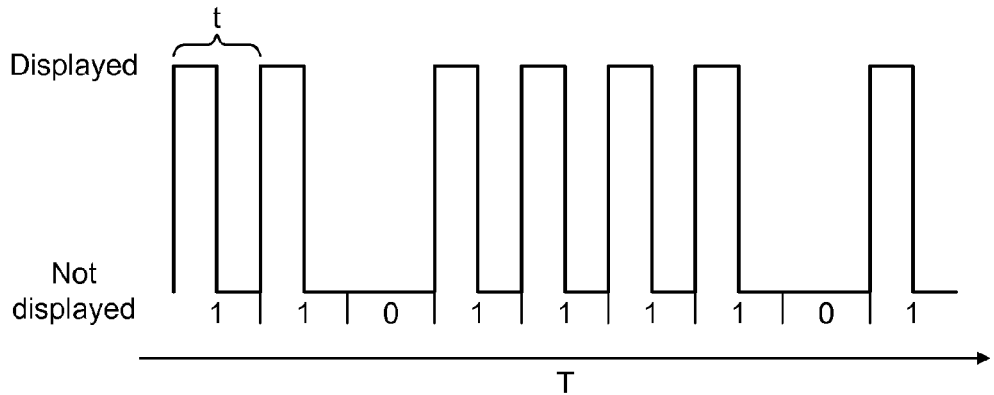
FIG. 10 shows a graph illustrating the display of an enhanced optical code pattern, and FIG. 11 provides a schematic diagram of components of a system for displaying and reading an enhanced optical code pattern.

The display of the enhanced optical code patter 901 shown in FIGS. 9*a* and 9*b* is explained further with reference to FIG. 10.

FIG. 10 shows a graph illustrating the display/non-display of the second part 903 over a period of time T to convey the data string 110111101.

As will be understood, this data string is representative of the encrypted authorisation data.

As can be seen from FIG. 10, over a period of time t, displaying the second part 903, followed by not displaying the second part corresponds to a binary "1". Not displaying the second part 1003 over a period of time t corresponds to a binary "0".

FIGS. 9*a* and 9*b* show an example in which the enhanced optical code pattern comprises first static parts and a single time varying part. In other examples, the time varying part may comprise a plurality of non-adjacent sub-parts, distributed throughout the optical pattern code in a regular or irregular pattern, rather than a single part. Furthermore, in some examples, the enhanced optical code pattern may not include the static parts, the time varying part being the only element in the optical code pattern. Thus, in some examples, the enhanced optical code might only include the second part 903 shown in FIG. 9*a*. Other elements may also be included in the enhanced optical code pattern but they may typically perform functions not relating to the conveying of data such as alignment parts and so on.

In the example shown in FIGS. 9*a* and 9*b* the time varying part switches between a first state in which it is displayed and a second state in which it is not displayed. However, other techniques are possible for displaying the time varying part in a time varying manner such that the variation of the display of the time varying part conveys the encrypted data.

Figure 9C:
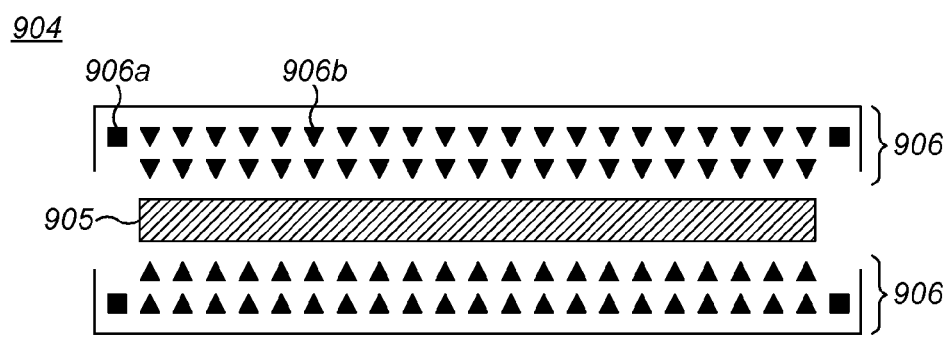
FIG. 9c provides a schematic diagram of another example of an enhanced optical code pattern.

FIG. 9*c* provides a schematic diagram of another example of an enhanced optical code pattern 904. The enhanced optical code pattern 904 includes a prominent central part 905 the display of which varies with time as described above. The enhanced optical code pattern 904 also includes non-varying parts 906 (i.e. parts that are displayed the whole time the enhanced optical code pattern is displayed) which include square shaped elements 906*a* and triangle shaped elements 906*b*. The non-varying parts 906 can be used for alignment purposes as described above.

In some examples, rather than switching between a displayed and not displayed state, the time varying part may switch between a first shape to a second shape. Alternatively, the time varying part may switch between a shape in a first orientation and the same shape in a different orientation. Alternatively, the time varying part may switch between being displayed in a first location within the enhanced optical code pattern and being displayed in a second location within the enhanced optical code pattern. Alternatively, the time varying part may switch between displaying a first plurality of sub-parts and displaying a second, different, plurality of sub-parts.

In other words, any suitable arrangement whereby the display of the time varying part can be switched between a first display state and a second display state (or any suitable number of display states) can be used.

Figure 11:
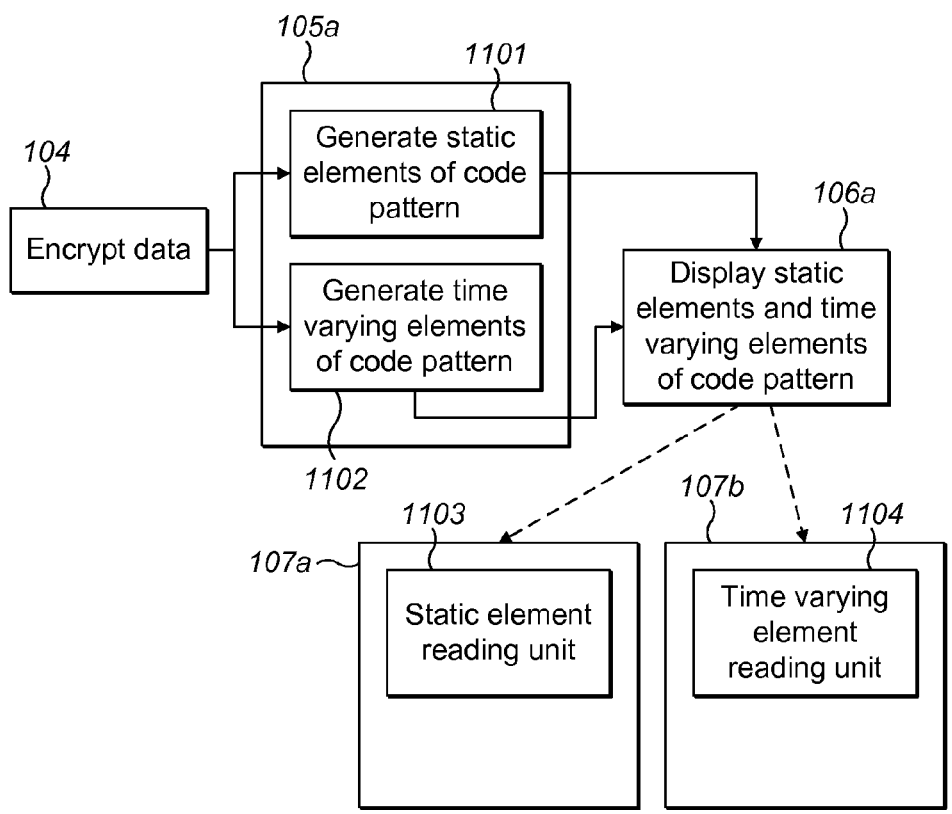

FIG. 11 provides a schematic diagram of an example of an encryption unit 104, optical code pattern generator 105*a* and display device 106*a* of a data source arranged in accordance with a system such as that explained with reference to FIG. 1.

In FIG. 11, the optical code pattern generator 105*a* and the display device 106*a* are adapted to display the enhanced optical code pattern explained with reference to FIGS. 9*a*, 9*b* and 10.

Specifically, the optical code pattern generator 105*a* includes a first pattern generator unit 1101 and a second pattern generator unit 1102. The first and second pattern generator units are arranged to receive the encrypted data from the encryption unit 104 and convert this is to display data corresponding to elements of an optical code pattern. The first pattern generator unit 1101 is adapted to convert the encrypted data from the encryption unit 104 to generate display control data corresponding to the static elements of the optical code pattern (e.g. parts 902 shown in FIGS. 9*a* and 9*b*). The second pattern generator unit 1102 is adapted to convert the encrypted data from the encryption unit 104 to generate display control data corresponding to the time varying element of the optical code pattern (e.g. the second part 903 shown in FIGS. 9*a* and 9*b*).

The display control data generated by the first and second pattern generator units is sent to the display device 106*a* which is arranged to combine the control display data from the first and second pattern generator units and display an optical code pattern comprising static elements and a time varying element as shown, for example, in FIGS. 9*a* and 9*b*.

FIG. 11 also shows first and second optical readers 107*a*, 107*b*, either one of which can be used to read the enhanced optical code displayed by the display device 106*a* and either one of which can be incorporated into a data destination 103 as shown in FIG. 1. As will be understood, a system will typically have one but not both of the first and second optical readers. Both first and second optical readers are shown in FIG. 11 for illustrative purposes only.

As with the optical reader 107 shown in FIG. 1, both optical readers 107*a*, 107*b* shown in FIG. 11 are arranged to convert the optical code pattern read from the display device 106*a* into data corresponding to the encrypted data generated by the encryption unit 104 and output this data to a decryption unit (not shown).

The first optical reader 107*a* includes a static element reading unit 1103 arranged to read the static elements of the optical code pattern displayed on the display device 106 and convert this into data corresponding to the encrypted data generated by the encryption unit 104. The second optical reader 107*b* includes a time varying element reading unit 1104 arranged to read the static elements of the optical code pattern displayed on the display device 106 and convert this into data corresponding to the encrypted data generated by the encryption unit 104.

User devices such as smart phones typically have screen refresh rates that can be in the order of 20 to 60 Hz which would readily enable the display of the time varying element of the enhanced optical code discussed above. Accordingly, as the skilled person would understand, the optical code generator 105*a* and display device 106*a* shown in FIG. 12 (along with the encryption unit 104) could readily be implemented in a smartphone, tablet or similar.

Similarly, image capture units such as those used in smart phones and similar devices, have refresh rates of which would readily allow the detection of the time varying element of an enhanced optical code pattern. Accordingly, as the skilled person would understand, the second optical reader 107b shown in FIG. 12 could readily be implemented in a smartphone, tablet or similar.

As the skilled person will understand, to detect the time varying element an image capture unit typically needs to have a refresh rate (i.e. rate at which image frames are captured) which is higher than the frequency at which the time varying element is displayed. For example, this could be ten or twenty times greater than the frequency at which a "1" or "0" is conveyed of the time varying element shown in FIG. 10, e.g. 10×1/t Hz or 20×1/t Hz.

Further, conventional one dimensional barcode scanners typically have a refresh rate enabling a conventional barcode scanner to be adapted to detect the time varying element of the enhanced optical pattern code.

It will be understood that the particular component parts of which the various systems described above are comprised are in some examples logical designations. Accordingly, the functionality that these component parts provide may be manifested in ways that do not conform precisely to the forms described above and shown in the diagrams. For example aspects of the invention, particularly the processes running on the user device and the authorisation server may be implemented in the form of a computer program product comprising instructions (i.e. a computer program) that may be implemented on a processor, stored on a data sub-carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

The invention claimed is:

1. A method of displaying an enhanced optical code pattern for providing a graphical representation of encoded authorisation data, said optical code pattern comprising a first part and a second part; said method comprising:
    displaying non-varying elements to form said first part and a time varying part to form said second part; and
    varying said second part by regularly switching between at least a first display state and a second display state which enables said encoded authorisation data to be conveyed to a suitably adapted optical reader.

2. The method according to claim 1, wherein an area over which said optical ode pattern is displayed comprises a grid.

3. The method according to claim 1, wherein presence of a shaded or non-shaded element or combination of elements at a particular position within said optical code pattern defines the presence or absence of a one or zero value for a specific bit position within a data string.

4. The method according to claim 3, wherein said data string is representative of said encrypted authorisation data.

5. The method according to claim 1, in which varying said second part comprises: switching between a first state in which said second part is displayed and a second state in which it is not displayed.

6. The method according to claim 1, in which varying said second part comprises: switching between a first shape and a second shape.

7. The method according to claim 1, in which varying said second part comprises: changing orientation of a shape forming said second part.

8. The method according to claim 1, in which varying said second part comprises: switching between displaying said second part in a first location within the enhanced optical code pattern and displaying said second part in a second location within the enhanced optical code pattern.

9. The method according to claim 1, in which varying said second part comprises: switching between displaying a first plurality of sub-parts and displaying a second, different plurality of sub-parts.

10. The method according to claim 1, in which said enhanced optical code pattern comprises first static parts and a single time varying part.

11. The method according to claim 1, in which said time varying part comprises a plurality of non-adjacent sub-parts, distributed throughout said optical pattern code in a regular or irregular pattern.

12. The method according to claim 1, wherein said optical code pattern comprises: elements which perform functions not relating to the conveying of data.

13. The method according to claim 12, wherein said functions not relating to the conveying of data comprise alignment.

14. A computer program product configured, when executed on a computer, to perform the method of claim 1.

15. A device configured to display an enhanced optical code pattern for providing a graphical representation of encoded authorisation data, said optical code pattern comprising a first part and a second part, said device comprising:
    display logic configured to display non-varying elements to form said first part and a time varying part to form said second part; and
    variance logic configured to vary said second part by regularly switching between at least a first display state and a second display state which enables said encoded authorisation data to be conveyed to a suitably adapted optical reader.

16. An optical code pattern reader configured to read an enhanced optical code pattern which provides a graphical representation of encoded authorisation data, said optical code pattern comprising a first part and a second part, said optical code pattern reader comprising:
    a static element reading unit configured to read static elements forming said first part of said optical code pattern and convert read data to said encoded authorisation data; and
    a time-varying element reading unit configured to read time varying elements forming said second part of said optical code pattern by regularly switching between at least a first display state and a second display state and convert read data to said encoded authorisation data.

17. A method of reading an enhanced optical code pattern which provides a graphical representation of encoded authorisation data, said optical code pattern comprising a first part and a second part, said method comprising:
    reading static elements forming said first part of said optical code pattern and converting read data to said encoded authorisation data; and
    reading time varying elements forming said second part of said optical code pattern by regularly switching between at least a first display state and a second display state and converting read data to said encoded authorisation data.

18. The method according to claim 17, comprising outputting said encoded authorisation data to a decryption unit.

19. A computer program product configured, when executed on a computer, to perform the method of claim 17.

* * * * *